Patented Sept. 18, 1945

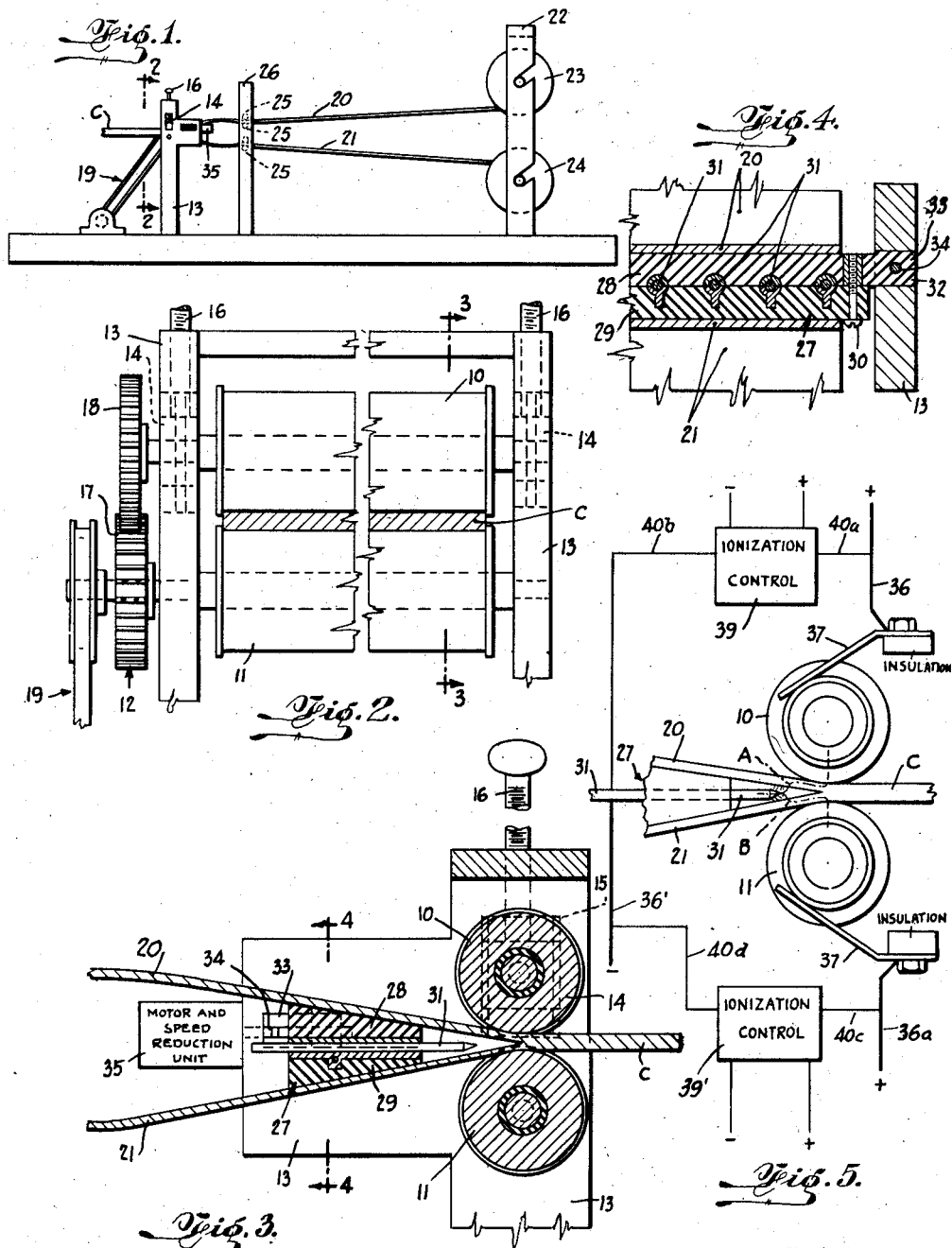

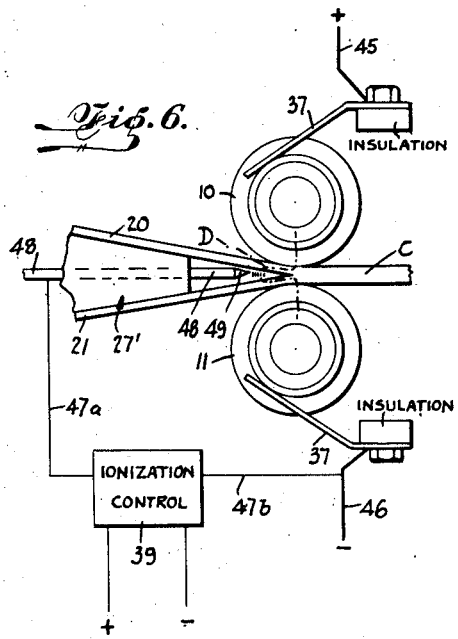
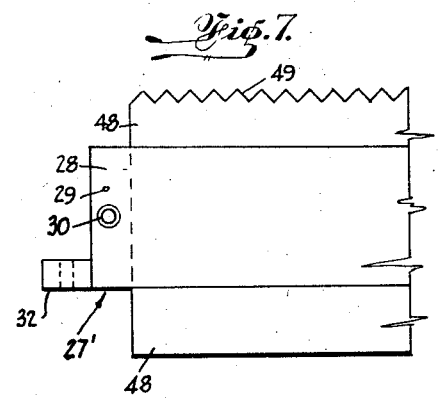
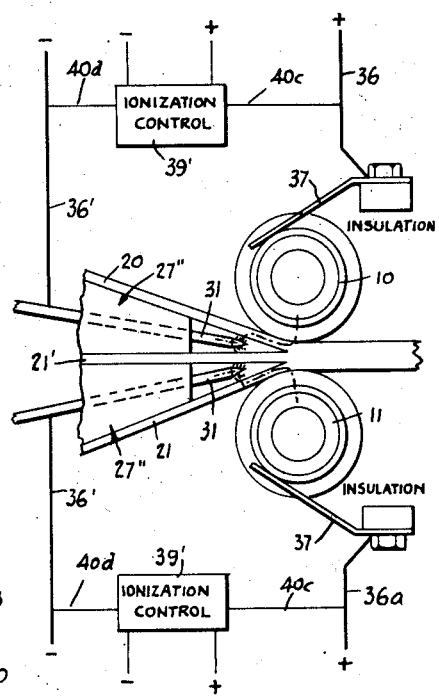
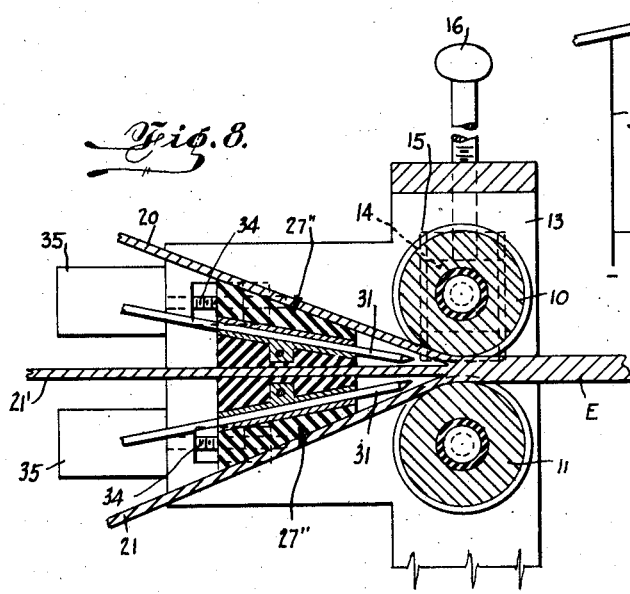

2,385,043

UNITED STATES PATENT OFFICE 2,385,043

ELECTRIC WELDING

Alfred Vang, Newark, N. J., assignor of one-half to Stevenson, Jordan & Harrison, Inc., New York, N. Y., a corporation of New York Application April 16, 1943, Serial No. 483,248

12 Claims. (Cl. 219—4)

This invention relates to new and useful improvements in electric welding, and has more particular reference to a new welding apparatus.

More particularly, the invention is directed to welding metallic sheets of similar or dissimilar metals together in face contact with each other, producing a new welded laminated or clad sheet.

The feature of the new article is to the effect that it comprises a laminated or clad sheet of any thickness, width and length composed of metal laminations of similar or dissimilar metals in face contact with each other and welded together throughout their entire contacting surfaces. Attention is particularly called to the fact that the sheets composing the new welded lamination sheet are not welded together at spots, such as could be done with spot welding, but are welded together homogenously throughout their contacting surfaces.

The uses for the new welded laminated sheet are innumerable. The sheets may be substituted for electrically plated or other types of plated or clad sheets and be used to make thousands of articles previously made from these materials. The new sheet is far superior in many ways to the sheets they are thus intended to replace. One advantage is the cheapness in manufacture and construction as it costs much less to laminate covering metal sheets upon a basic metal sheet, in accordance with this invention, compared with the corresponding cost of electro-plating the basic sheet with an identical thickness of clad material. In fact, electro-plating is a very expensive process unless but a thin deposit is applied, and then the sheets are not durable, as the plating rapidly wears off. Electro-plated sheets have another deficiency in that the deposited metal is porous even if applied quite thickly. The porous nature of such sheets is objectionable in many cases, particularly in chemical uses where they are required to line chemical tanks, tubes, vats, and other objects.

Another important feature of the new welded laminated sheets is that it may be used to save scarce raw materials. For example, a laminated sheet may easily be constructed containing an inferior or cheaper inner lamination, and having covering laminations of more expensive or better quality metals. Some suggestions for such new welded laminated sheets would be the welding of steel sheets or iron, or steel of different grades and characteristics, upon each other. Additional suggestions would be copper or brass, or tin on steel, and aluminum on steel, copper or brass.

Thus, new welded, laminated sheets, as suggested above, could be used for any number of purposes. As for example, constructing the hulls of ships, the wings of airplanes, armor plating, for the tubes of boilers, refrigerators, and chemical apparatus of numerous types. The process could also be used for producing the conventional copper clad bullets. Many additional uses will readily be recognized by the engineering profession.

The dominating feature of the new method of welding embodied in this invention resides in the fact that the welding method is substantially a new arc welding method, as distinguished from resistance welding. However, the new method is characterized by feeding sheets of metallic material to be welded together from separated superimposed sources to a common contacting line, applying pressure for forcing these sheets together at the contacting line, and passing the welding current through the sheets slightly forward of said contacting line. An important feature of the new method resides in the way the welding current is controlled, so as to pass through the sheets as desired. In this connection, it is proposed to ionize the atmosphere between said sheets in the vicinity of said contacting line for initiating and supporting the welding current. It is also proposed to so direct the welding current that arcing occurs at the adjacent faces of said sheets melting the adjacent skins of the sheets which are then forced together by said pressure and become welded.

An important feature of the new welding process resides in the fact that the metal sheets being welded stay relatively cool. It is only the skins of these sheets at the welding line that momentarily melt and are then forced together to produce the weld. Since the sheets stay cool there is no great crystallization. Another important advantage is that little electric energy is needed for the welding operation, because it is required to melt or soften the skins of the sheets only at the welding line.

Furthermore, the invention proposes to carry out the pressure applying step by using a pressure roller and a counterpressure roller. It is proposed to pass the welding current through these rollers since they control the contacting line of the sheets. An important feature of the invention resides also in the fact that these rollers remain cool.

The step in the new method calling for the ionizing of the atmosphere between the metal sheets being welded in the vicinity of the contacting line is an important one. It is because the atmosphere at this location is ionized that it is possible to initiate the welding current to travel in the path desired, and produce the welding arcs at the line desired. The invention contemplates several modified forms, some of which distinguish from each other in the ionizing step. In one of these forms the ionizing is used solely to initiate the welding current. In another form, continued ionizing of the atmosphere is used also to support the welding current.

The ionization of gases, air included, is old and generally known. Some general reference to such ionization may be seen in my prior inventions covered by U. S. Patents Nos. 2,287,541 and 2,287,544, each granted June 23, 1942.

In the instant invention it is proposed to initiate and support the welding current by producing a sharp pulse or pulses of potentiality in the desired vicinity. It is proposed to produce these sharp pulses with high frequency, high voltage current similar to those obtained in a conventional make and break induction coil. These pulses cause a resulting sharp pulsation of the electro-static field and produce sufficient ionization of the atmosphere in said vicinity to initiate and support the flow of welding current. It is proposed that the welding current be a direct current of relatively low voltage, for example, anywhere from several volts up to twenty or so volts. Of course, this direct current must be of high amperage.

With the above and other objects in view, this invention consists of the novel features of construction, combination, and arrangement of parts, hereinafter fully described, claimed and illustrated in the accompanying drawings, forming part of this application, and in which similar characters of reference indicate corresponding parts in all views, and in which:

Figure 1 is a side elevational view of an apparatus for welding sheet metals in accordance with this invention.

Figure 2 is a fragmentary enlarged vertical, transverse sectional view, taken on the line 2—2 of Figure 1.

Figure 3 is a fragmentary enlarged longitudinal vertical sectional view taken on the line 3—3 of Figure 2.

Figure 4 is a fragmentary transverse vertical sectional view, taken on the line 4—4 of Figure 3.

Figure 5 is a schematic wiring diagram of the apparatus.

Figure 6 is a schematic wiring diagram similar to Figure 5, but illustrating a modified form of the apparatus.

Figure 7 is a fragmentary plan view of the electrode used in Figure 6.

Figure 8 is a fragmentary sectional view similar to Figure 3, but showing another modified form of the invention.

Figure 9 is a schematic wiring diagram of the apparatus shown in Figure 8.

The apparatus for welding sheets of similar or dissimilar metals together in face contact with each other, in accordance with this invention, as disclosed in Figures 1 to 5, includes a pressure roller 10 and a counter-pressure roller 11. These rollers are connected with a drive system 12 for feeding the sheet material to be welded between them. These rollers 10 and 11 are mounted in a frame 13. The pressure roller 10 is rotatively supported in blocks 14 which are slidable in slots 15, formed in the frame 13. Adjustment screws 16 are threadedly engaged through the frame 13 and are rotatively connected with the blocks 14, by which the degree of pressure may be controlled. It should be borne in mind that the particular system for applying the pressure is merely for purposes of illustration and that a more elaborate and more efficient system may well be used in practice.

The drive system 12 includes gears 17 and 18, meshing with each other and connected with the shafts of the said rollers 10 and 11. A transmission 19 is connected with one of these gears. Certain guide means is used for guiding metal sheets 20 and 21, which are to be welded from separated sources to and between the rollers 10 and 11, so as to be in face contact with each other. The guiding means includes a frame 22 which supports rollers 23 and 24 from which the sheets 20 and 21 are drawn. These sheets 20 and 21 pass between guide rollers 25, mounted on the standard 26, which is quite close to the frame 13.

An ignition and welding electrode 27, which is at least as wide as the sheets 20 and 21 is located between said sheets at a line slightly in front of the said rollers 10 and 11, so as to be located in the apex vicinity formed by said sheets 20 and 21 meeting and contacting each other. This ignition and welding electrode may be of various designs. The particular design shown includes a top insulation section 28, clamped to a bottom insulation section 29 by fastening screws 30. A plurality of electrode elements 31 are clamped in between these sections 28 and 29. The fastening elements 30 may be loosened and the electrode elements 31 adjusted forwards and rearwards as required. The top section 28 is provided with projecting end portions 32, which slidably engage track openings 33 formed in the frame 13. Screws 34 threadedly engage these projecting portions 32 and are connected with the driving mechanism, such as the motor and speed reduction units 35. With this arrangement the electrode 27 may be moved closer to or may be drawn away from the vicinity of the contacting line of the sheets 20 and 21.

The apparatus also includes means for supplying a welding current between the rollers 10 and 11 and the electrode elements 31. This means includes a direct current circuit, having the positive lead 36 connecting with brush means 37 for transferring the current to the roller 10, and a negative lead 36' connected with the electrode elements 31. It also includes another positive lead 36a connected with another brush device 37 for transferring the current to the roller 11. This circuit is also completed by the negative lead 36'.

The means for ionizing the atmosphere bounded by the said sheets 20 and 21 from their line of contact between the rollers 10 and 11 to the electrode 27, for controlling the said welding and causing arcs between the adjacent faces of the sheets 20 and 21, includes ionization control means 39, connected in a circuit 40a, 40b across the leads 36 and 36', and also a second ionization control means 39' connected in a circuit 40c, 40d across the leads 36a and 36'. The details of this ionization control means will not be given in this specification as such means are generally known. However, it is pointed out that they are in the nature of a conventional make and break induction coil system.

The operation of the device is as follows:

The welding circuit may be traced from the lead 36 to the brush means 37, the roller 10 and then through some theoretical path, such as that illustrated by the dot and dash lines A in Figure 5 to the electrode elements 31. Another branch of the welding current may be traced from the lead 36a to the brush means 37, the roller 11 and then through the theoretical path indicated by the dot and dash lines B to the electrode elements 31. This welding current is a low voltage direct current which may vary according to design, anywhere from several volts to twenty volts or so. Normally, this current could not be initiated to flow to the electrode elements 31, except the electrode elements were placed in physical contact with the sheets 20 and 21, and then drawn away. However, this would not be a very satisfactory arrangement, particularly in view of the fact that the arcs may not be maintained and would continually blow out.

However, the ionization control is capable of ionizing the atmosphere between the sheets 20 and 21 in the vicinity of the contacting line of these sheets and the electrode elements 31. This ionization control is in the nature of sharp pulses of high frequency, high voltage potentiality, resulting in sharp pulsations of the electrostatic field, and is capable of initiating and supporting the flow of the welding current. The arcs flowing between the skins of the sheets 20 and 21 melt these skins at this line, and while the skins are still melted the sheets 20 and 21 advance so that the melted sections are now subjected to the pressure supplied by the pressure roller 10 and the counterpressure roller 11. This completes the welding operation; and the weld will be homogenous across the contacting faces of these sheets.

It is pointed out that the drive system 12 is continuously operating so that the sheets 20 and 21 are continuously being fed through the rollers 10 and 11. Simultaneously, they are being welded. The welded sheet indicated on the drawing by the reference character C emerges from the back sides of the rollers 10 and 11.

In Figures 6 and 7 a modified form of the invention has been disclosed which distinguishes from the prior form in several respects. In this form of the invention the welding circuit may be traced from the positive lead 45 to the brush means 37, the pressure roller 10, the counterpressure roller 11, the brush means 37, and then to the negative lead 46. The ionization control means 39 is connected in a circuit 47a, 47b between one of the leads of the welding circuit and the welding element 48. The electrode element 48 is in the nature of an electrode element, extending the complete width of the electrode 27' and formed with a plurality of serrations or pointed portions 49 on its lead edge. In this form of the invention the ionization control operates to initiate the welding and maintain the welding current which is schematically indicated by the dot and dash lines D. Thus arcing is produced between the adjacent faces of the sheets 20 and 21.

In other respects this form of the invention is identical to the previous form and like parts are indicated by like reference numerals.

The operation of this form of the invention is substantially identical to the prior form, distinguishing merely in the fact that the ionization control means is used to initiate and maintain the welding current. Here again the welding current is a low voltage direct current. The ionization control current is a high frequency, high voltage current. The welding arc is produced between the apex vicinity formed by the sheets 20 and 21, and the igniting and welding electrode element 48.

In Figures 8 and 9 another modified form of the invention is disclosed which is very similar to the form shown in Figures 6 and 7, distinguishing in the fact that three sheets of metal, indicated by reference numerals 20, 21, and 21' are being simultaneously welded into a welded, laminated or clad sheet E. In this form of the invention there are two electrodes 27" located respectively between the sheets 20 and 21', and the sheets 21' and 21. The welding circuit is indicated by the positive leads 36 and 36a, and the negative leads 36'. The ionization control is indicated by the reference numerals 39' and is shown connected in the circuits 40c, 40d.

In other respects this form of the invention is identical to the previous forms and like parts are indicated by similar reference numerals.

The operation of this form of the invention is substantially similar to the previous form, distinguishing merely in the fact that the three sheets 20, 21, and 21' are continuously moving between the rollers 10 and 11, and are simultaneously welded together into a single laminated or clad sheet E. The welding circuit is initiated and maintained by the ionization control means as previously described.

It is obvious that slight changes may be made in the form, construction, and arrangement of the several parts, as shown, within the scope of the appended claims, without departing from the spirit of the invention, and I do not, therefore, wish to limit myself to the exact construction and arrangement shown and described herein.

What I claim as new and desire to secure by Letters Patent of the United States, is:

1. An apparatus for welding sheets of similar or dissimilar metals, together in face contact with each other, comprising pressure and counterpressure feeding rollers, means for guiding said sheet metals from separated sources to and between said rollers, so as to be in face contact with each other, an ignition electrode which is at least as wide as said sheets and located between said sheets at a line slightly in front of said rollers, so as to be located in the apex vicinity formed by said sheets meeting and contacting with each other, means for supplying a welding current to flow between said rollers and electrode, and means for ionizing the atmosphere bounded by said sheets from their line of contact to said electrode for controlling said welding current and causing it to arc between the adjacent faces of said sheets and electrode, and for melting the adjacent skins of said sheets, which are then forced together by said rollers and become welded.

2. An apparatus for welding sheets of similar or dissimilar metals, together in face contact with each other, comprising pressure and counterpressure feeding rollers, means for guiding said sheet metals from separated sources to and between said rollers, so as to be in face contact with each other, an ignition electrode which is at least as wide as said sheets and located between said sheets at a line slightly in front of said rollers, so as to be located in the apex vicinity formed by said sheets meeting and contacting with each other, means for supplying a welding current to flow between said rollers and electrode, and means for ionizing the atmosphere bounded by said sheets from their line of contact to said electrode for controlling said welding current and causing it to arc between the adjacent faces of said sheets and electrode, and for melting the adjacent skins of said sheets, which are then forced together by said rollers and become welded, said ignition electrode being in the nature of a welding electrode, and including means for supplying high frequency, high voltage impulses.

3. An apparatus for welding sheets of similar or dissimilar metals, together in face contact with each other, comprising pressure and counterpressure feeding rollers, means for guiding said sheet metals from separated sources to and between said rollers, so as to be in face contact with each other, an ignition electrode which is at least as wide as said sheets and located between said sheets at a line slightly in front of said rollers, so as to be located in the apex vicinity formed by said sheets meeting and contacting with each other, means for supplying a welding current to flow between said rollers and electrode, and means for ionizing the atmosphere bounded by said sheets from their line of contact to said electrode for controlling said welding current and causing it to arc between the adjacent faces of said sheets and electrode, and for melting the adjacent skins of said sheets, which are then forced together by said rollers and become welded, said means for supplying said welding current including means for supplying low voltage direct current.

4. An apparatus for welding sheets of similar or dissimilar metals, together in face contact with each other, comprising pressure and counterpressure feeding rollers, means for guiding said sheet metals from separated sources to and between said rollers, so as to be in face contact with each other, an ignition electrode which is at least as wide as said sheets and located between said sheets at a line slightly in front of said rollers, so as to be located in the apex vicinity formed by said sheets meeting and contacting with each other, means for supplying a welding current to flow between said rollers and electrode, and means for ionizing the atmosphere bounded by said sheets from their line of contact to said electrode for controlling said welding current and causing it to arc between the adjacent faces of said sheets and electrode, and for melting the adjacent skins of said sheets, which are then forced together by said rollers and become welded, said electrode being also in the nature of a welding electrode, having a plurality of adjustable electrode elements.

5. An apparatus for welding sheets of similar or dissimilar metals, together in face contact with each other, comprising pressure and counterpressure feeding rollers, means for guiding said sheet metals from separated sources to and between said rollers, so as to be in face contact with each other, an ignition electrode which is at least as wide as said sheets and located between said sheets at a line slightly in front of said rollers, so as to be located in the apex vicinity formed by said sheets meeting and contacting with each other, means for supplying a welding current to flow between said rollers and electrode, and means for ionizing the atmosphere bounded by said sheets from their line of contact to said electrode for controlling said welding current and causing it to arc between the adjacent faces of said sheets and electrode, and for melting the adjacent skins of said sheets, which are then forced together by said rollers and become welded, said electrode being also in the nature of a welding electrode, including a plurality of welding elements.

6. An apparatus for welding sheets of similar or dissimilar metals, together in face contact with each other, comprising pressure and counterpressure feeding rollers, means for guiding said sheet metals from separated sources to and between said rollers, so as to be in face contact with each other, an ignition electrode which is at least as wide as said sheets and located between said sheets at a line slightly in front of said rollers, so as to be located in the apex vicinity formed by said sheets meeting and contacting with each other, means for supplying a welding current to flow between said rollers and electrode, and means for ionizing the atmosphere bounded by said sheets from their line of contact to said electrode for controlling said welding current and causing it to arc between the adjacent faces of said sheets and electrode, and for melting the adjacent skins of said sheets, which are then forced together by said rollers and become welded; said electrode being also in the nature of a welding electrode, including an electrode element having a serrated front edge.

7. An apparatus for welding sheets of similar or dissimilar metals, together in face contact with each other, comprising pressure and counterpressure feeding rollers, means for guiding said sheet metals from separated sources to and between said rollers, so as to be in face contact with each other, an electrode located between said sheets and terminating at a line slightly in front of said rollers, so as to be located in the apex vicinity formed by said sheets meeting and contacting with each other, and means for supplying current to said rollers and electrode.

8. An apparatus for welding sheets of metal, together in face contact with each other, comprising axially stationary pressure and counterpressure rollers, means for guiding said sheet metals from separated sources to said rollers, so as to come in face contact with each other therebetween, whereby the inner faces of the sheets form a dihedral angle, an insulator mounted in substantially fixed relation to the axes of the rollers within said angle and adapted to engage the inner faces of the sheets, an electrode lying in a plane intermediate of the sheets and projecting through the insulator and near the line of contact of the sheets, but not touching the latter; means for supplying a welding current to flow between the rollers and the electrode, and means for ionizing the air between said electrode and the sheets.

9. An apparatus for welding sheets of metal, together in face contact with each other, comprising axially stationary pressure and counterpressure rollers, means for guiding said sheet metals from separated sources to said rollers, so as to come in face contact with each other therebetween, whereby the inner faces of the sheets form a dihedral angle, a wedge-shaped insulator mounted in substantially fixed relation to the axes of the rollers and in front thereof, the angle faces of the wedge being adapted to engage the inner faces of the sheets, the insulator and the two sheets surrounding an air space, and an electrode lying substantially in a plane intermediate of said sheets and passing through the insulator into said air space and near, but not touching the sheets.

10. An apparatus for welding sheets of metal, together in face contact with each other, comprising axially stationary pressure and counterpressure rollers, means for guiding said sheet metals from separated sources to said rollers, so as to come in face contact with each other therebetween, whereby the inner faces of the sheets form a dihedral angle, a wedge-shaped insulator mounted in substantially fixed relation to the axes of the rollers and in front thereof, the angle faces of the wedge being adapted to engage the inner faces of the sheets, the insulator and the two sheets surrounding an air space, and a plurality of electrodes passing through the insulator into said air space and terminating in a line parallel to and near the edge of the dihedral angle, but not touching the sheets.

11. An apparatus for welding sheets of metal, together in face contact with each other, comprising axially stationary pressure and counterpressure rollers, means for guiding said sheet metals from separated sources to said rollers, so as to come in face contact with each other therebetween, whereby the inner faces of the sheets form a dihedral angle having an edge substantially between the rollers, a truncated wedge-shaped insulator mounted in substantially fixed relation to the axes of the rollers and in front thereof, the angle faces of the wedge being adapted to engage the inner faces of the sheets, the truncated face of the insulator and the two sheet faces surrounding an air space, and an electrode lying in a plane intermediate of the sheets and passing through the insulator and being provided with a pointed end portion within said space and near to the edge of the dihedral angle, but not touching the sheets, the insulator having the triple function of guiding the sheets in the immediate vicinity of the rollers, maintaining the electrode in spaced relation to the sheets, and confining arcing to said space.

12. An apparatus for welding sheets of metal, together in face contact with each other, comprising axially stationary pressure and counterpressure rollers, means for guiding said sheet metals from separated sources to said rollers, so as to come in face contact with each other therebetween, whereby the inner faces of the sheets form a dihedral angle having an edge substantially between the rollers, a truncated wedge-shaped insulator mounted in substantially fixed relation to the axes of the rollers and in front thereof, the angle faces of the wedge being adapted to engage the inner faces of the sheets, the truncated face of the insulator and the two sheet faces surrounding an air space, and a flat electrode lying in a plane intermediate of the planes of the dihedral angle and passing through the insulator into the air space and being provided with a serrated edge therein substantially equidistant from the two sheets and near the line of contact between the latter.

ALFRED VANG.